T. A. BOOR.
HOSE CLAMP.
APPLICATION FILED DEC. 15, 1914. RENEWED MAR. 16, 1917.

1,224,062.
Patented Apr. 24, 1917.

WITNESSES
F. D. Sweet
J. L. McAuliffe

INVENTOR
Theodore A. Boor
BY
ATTORNEYS

UNITED STATES PATENT OFFICE.

THEODORE A. BOOR, OF ASHVILLE, OHIO.

HOSE-CLAMP.

1,224,062.

Specification of Letters Patent.

Patented Apr. 24, 1917.

Application filed December 15, 1914, Serial No. 877,336. Renewed March 16, 1917. Serial No. 155,360.

*To all whom it may concern:*

Be it known that I, THEODORE A. BOOR, a citizen of the United States, and a resident of Ashville, in the county of Pickaway and State of Ohio, have invented a new and Improved Hose-Clamp, of which the following is a full, clear, and exact description.

My invention is more particularly designed for use in clamping the hose employed on automobiles, to establish the water supply with the radiator, and with the use of ordinary metallic clamps on the hose of an automobile, the severe vibrations and jars to which the vehicle is subjected tend to loosen the clamps, and therefore require that the latter be made very tight. In tightening the usual clamps the rigid members composing the same subject the hose to severe pressure, and frequently puncture of the hose or mutilation of it results, thereby producing leaks.

The prime object of my invention is to provide a hose clamp in the form of an elastic band which may be readily attached and detached, and will exert the necessary compression on the hose without engaging the latter, while at the same time the clamp will very effectively resist the jarring and vibration to which it is subjected when employed on an automobile.

The invention will be particularly explained in the specific description following.

Reference is had to the accompanying drawings forming part of this specification, in which similar characters of reference indicate corresponding parts in all the views, and in which.

Figure 1:
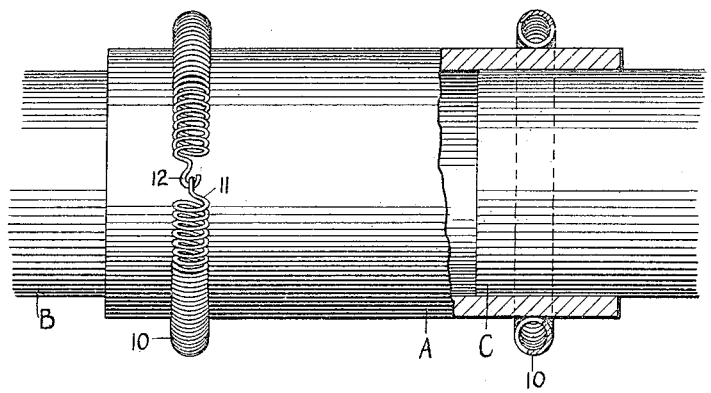
Figure 1 is a side elevation partly in section, showing my improved hose clamps applied to a piece of hose and elements to be connected by the hose, said elements being conventionally shown.

In Fig. 1, two of my improved clamps are shown on a hose A, to clamp the hose in position on elements B, C, to establish communication between said elements. In producing my improved clamp, a helical spring is formed into an elastic compression band 10 to embrace the hose. In connection with the terminal ends of the band I provide means for detachably uniting said ends. In the form shown in Fig. 1 the respective ends of the coil are formed with integral mating members 11, 12, which member 11 constitutes an eye and the member 12 a hook to engage the eye, said members being disposed in planes perpendicular to each other.

The length of the coil is so proportioned to the periphery of the hose that the coil forming the band will need to be distended in order to encircle the hose and permit the members 11 and 12 to be engaged. In this way the reaction of the elastic band will have a compressing action on the hose, thereby firmly clamping the same on to the element B or C so as to form a water tight connection. The resiliency of the compression band, however, is such that no puncture or cutting of the hose will result. Moreover, the jarring to which the hose and its clamp are subjected will be resisted by the clamp, and the latter maintained firmly against displacement.

Figure 2:
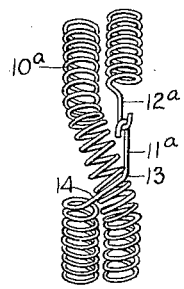
Fig. 2 is a side elevation of another form of my improved clamp.

In Fig. 2 the elastic compression band 10$^a$ is in convoluted form and presents terminal ends at opposite sides of an intermediate convolution. The terminal ends are detachably connected by fastening means crossing the intermediate convolution of the band. The fastening means comprise elements 11$^a$, 12$^a$, presenting mating hooks to engage each other. One element, 11$^a$, extends in a generally oblique direction across the intermediate convolution of the band, and in order to insure that the said element will enter readily between two of the adjacent inner convolutions presented by the spring coil, the said member is given a bend as indicated at 13, whereby to present two arms at an angle to each other, the obliquity of one arm 14 disposing the said arm to enter the coil while the other arm of the member 11$^a$ assumes a more straight direction toward the mating fastener element 12$^a$.

Figure 3:
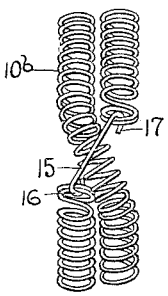
Figs. 3, 4 and 5 are side elevations of other forms of my improved clamp.

The form shown in Fig. 3 is similar to that in Fig. 2, the band 10$^b$ presenting an intermediate convolution and terminal ends at the sides of said convolution. The fastening element 15 is separate from the spring coil, having an eye 16 embracing the terminal convolutions of the coil at one end of the latter. The said element 15 is of a length to extend across the intermediate convolution of the band, and the end 17 opposite the eye 16 is given the form of a hook to engage the end convolution of the adjacent terminal of the coil.

Figure 4:
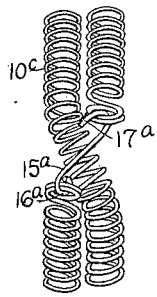

In Fig. 4 the fastener element $15^a$ is fastened at one end by an eye $16^a$ to one terminal of the spring coil, and extends obliquely across the intermediate convolution $10^c$ of the band, and terminates in a hook $17^a$ to engage the adjacent terminal of the coil. The eye $16^a$ and hook $17^a$ are similar to the eye 16 and hook 17 of Fig. 3, except that in Fig. 3 the eye and the hook are formed at the same side of the member 15, whereas the eye $16^a$ and hook $17^a$ are on opposite sides of the member $15^a$, said member therefore having the general form of an S hook.

Figure 5:
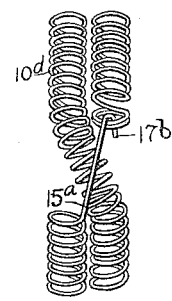

In the form shown in Fig. 5 the compression band is similar to that shown in Figs. 2 to 4. The fastener element $15^a$ is integral at one end with a terminal on the spring coil, and is of a length to cross the intermediate convolution $10^b$ to the band, the opposite terminal being engaged by the hooked end $17^b$ of the fastener element. The plurality of cross convolutions has an increased clamping effect on the hose, and resists to even a greater degree than the single circular band of Fig. 1, the jarring action to which the hose is subjected. The matter shown in Fig. 1 of the drawing has been made the subject of another application.

Having thus described my invention, what I claim as new and desire to secure by Letters Patent, is:

A hose clamp comprising a helical band presenting a crossing portion of a convolution between the terminal ends of the band, and a fastening means detachably uniting the ends of the band, said means ranging obliquely across said portion of the convolution and having a bend presenting arms at an angle to each other.

In testimony whereof I have signed my name to this specification in the presence of two subscribing witnesses.

THEODORE A. BOOR.

Witnesses:
 JOHN McNEAL,
 GEORGE W. MORRISON.

Copies of this patent may be obtained for five cents each, by addressing the "Commissioner of Patents, Washington, D. C."